(12) United States Patent
Jadhav et al.

(10) Patent No.: US 11,062,372 B2
(45) Date of Patent: Jul. 13, 2021

(54) METHOD FOR RELEVANCY RANKING OF PRODUCTS IN ONLINE SHOPPING

(71) Applicant: Facebook, Inc., Menlo Park, CA (US)

(72) Inventors: Apurva Jadhav, Mountain View, CA (US); Shashikant Khandelwal, Mountain View, CA (US); Nikhil Gupta, Palo Alto, CA (US); Gurpreetsingh Sachdev, Mountain View, CA (US)

(73) Assignee: Facebook, Inc., Menlo Park, CA (US)

(*) Notice: Subject to any disclaimer, the term of this patent is extended or adjusted under 35 U.S.C. 154(b) by 819 days.

(21) Appl. No.: 15/667,580

(22) Filed: Aug. 2, 2017

(65) Prior Publication Data

US 2017/0330262 A1    Nov. 16, 2017

Related U.S. Application Data

(63) Continuation of application No. 13/936,106, filed on Jul. 5, 2013, now Pat. No. 9,779,441, which is a
(Continued)

(51) Int. Cl.
*G06F 16/95* (2019.01)
*G06Q 30/06* (2012.01)
(Continued)

(52) U.S. Cl.
CPC ....... *G06Q 30/0627* (2013.01); *G06F 16/248* (2019.01); *G06F 16/24578* (2019.01);
(Continued)

(58) Field of Classification Search
CPC .... G06F 16/338; G06F 16/248; G06F 16/353; G06F 16/838; G06F 16/951;
(Continued)

(56) References Cited

U.S. PATENT DOCUMENTS 5,893,095 A   4/1999   Jain et al.
6,236,990 B1  5/2001   Geller et al.
(Continued)

OTHER PUBLICATIONS

Jarvelin et al., Cumulated Gain-Based Evaluation of IR Techniques, 2002 (Year: 2002).*

(Continued)

*Primary Examiner* — Brittany N Allen
(74) *Attorney, Agent, or Firm* — Fenwick & West LLP (57) ABSTRACT

Systems and methods for ranking one or more products in online shopping. One or more products are identified based on a search query received from user. The one or more products are ranked based on terms present in the search query. Each of the one or more products has one or more attributes associated with it. An attribute score for each of the one or more products is determined. Further, based on the attribute score, the relevancy of the one or more products is determined. Based on the relevancy, a marginal relevancy score for each of the one or more products is determined. The one or more products are re-ranked based on the marginal relevancy score. The rank of the one or more products can also be modified to optimize revenue generation.

16 Claims, 5 Drawing Sheets

Related U.S. Application Data continuation-in-part of application No. 11/881,950, filed on Jul. 30, 2007, now Pat. No. 8,510,298.

(60) Provisional application No. 60/835,556, filed on Aug. 4, 2006.

(51) Int. Cl.

| | | |
|---|---|---|
| *G06Q 30/02* | (2012.01) | |
| *G06F 16/2457* | (2019.01) | |
| *G06F 16/35* | (2019.01) | |
| *G06F 16/951* | (2019.01) | |
| *G06F 16/9535* | (2019.01) | |
| *G06F 16/248* | (2019.01) | |
| *G06F 16/9538* | (2019.01) | |
| *G06F 16/838* | (2019.01) | |
| *G06F 16/338* | (2019.01) | |

(52) U.S. Cl.
CPC .......... *G06F 16/353* (2019.01); *G06F 16/951* (2019.01); *G06F 16/9535* (2019.01); *G06F 16/9538* (2019.01); *G06Q 30/0206* (2013.01); *G06Q 30/0282* (2013.01); *G06Q 30/0629* (2013.01); *G06F 16/338* (2019.01); *G06F 16/838* (2019.01)

(58) Field of Classification Search
CPC .......... G06F 16/9535; G06F 16/24578; G06Q 30/0251; G06Q 30/0206; G06Q 30/0627; G06Q 30/0629; G06Q 30/0282
See application file for complete search history.

(56) References Cited

U.S. PATENT DOCUMENTS

| | | | | |
|---|---|---|---|---|
| 6,408,093 | B1* | 6/2002 | Hu | G06K 9/6217 |
| | | | | 382/219 |
| 6,714,933 | B2 | 3/2004 | Musgrove et al. | |
| 7,249,126 | B1 | 7/2007 | Ginsburg et al. | |
| 7,302,429 | B1 | 11/2007 | Wanker | |
| 7,418,447 | B2 | 8/2008 | Caldwell et al. | |
| 7,783,620 | B1 | 8/2010 | Chevalier et al. | |
| 7,835,943 | B2* | 11/2010 | Cheung | G06Q 30/02 |
| | | | | 705/14.54 |
| 7,925,651 | B2* | 4/2011 | Burges | G06F 16/334 |
| | | | | 707/723 |
| 8,037,043 | B2* | 10/2011 | Zoeter | G06F 16/951 |
| | | | | 707/705 |
| 8,838,583 | B1 | 9/2014 | Fox | |
| 2002/0013735 | A1 | 1/2002 | Arora et al. | |
| 2002/0138481 | A1 | 9/2002 | Aggarwal et al. | |
| 2002/0165849 | A1 | 11/2002 | Singh et al. | |
| 2003/0195877 | A1 | 10/2003 | Ford et al. | |
| 2003/0217052 | A1 | 11/2003 | Rubenczyk et al. | |
| 2004/0019536 | A1 | 1/2004 | Ashkenazi et al. | |
| 2004/0068413 | A1 | 4/2004 | Musgrove et al. | |
| 2005/0246328 | A1 | 11/2005 | Zhang et al. | |
| 2006/0112099 | A1 | 5/2006 | Musgrove et al. | |
| 2006/0241901 | A1 | 10/2006 | Hanus et al. | |
| 2007/0038620 | A1 | 2/2007 | Ka et al. | |
| 2007/0073641 | A1 | 3/2007 | Perry et al. | |
| 2007/0094171 | A1 | 4/2007 | Burges et al. | |
| 2007/0239702 | A1* | 10/2007 | Vassilvitskii | G06F 16/951 |
| 2009/0037402 | A1* | 2/2009 | Jones | G06F 16/951 |
| 2009/0089274 | A1* | 4/2009 | Chapelle | G06F 16/951 |
| 2010/0250523 | A1* | 9/2010 | Jin | G06F 16/951 |
| | | | | 707/723 |
| 2010/0318540 | A1* | 12/2010 | Svore | G06F 16/951 |
| | | | | 707/759 |
| 2011/0145175 | A1* | 6/2011 | Agarwal | G06N 20/00 |
| | | | | 706/12 |
| 2011/0191315 | A1* | 8/2011 | Neumeyer | G06Q 30/0243 |
| | | | | 707/706 |
| 2013/0046768 | A1* | 2/2013 | He | G06F 16/9024 |
| | | | | 707/748 |
| 2015/0317400 | A1* | 11/2015 | Charkov | G06F 16/24578 |
| | | | | 707/724 |
| 2019/0171753 | A1* | 6/2019 | Teng | G06Q 50/01 |

OTHER PUBLICATIONS

Rodrygo L.T. Santos, Craig Macdonald, and Iadh Ounis. 2010. Selectively diversifying web search results. In Proceedings of the 19th ACM international conference on Information and knowledge management. Association for Computing Machinery, New York, NY, USA, 1179-1188. (Year: 2010).*

Williams, Measuring Search Relevance, Nov. 10, 2010, ebay, Search Science in Engineering (Year: 2010).*

Mori, T. et al.; "Information Gain Ratio meets Maximal Marginal Relevance", Proceedings of the Third NTCIR Workshop, Sep. 2001-2002, eight pages.

United States Office Action, U.S. Appl. No. 11/881,950, dated Jul. 20, 2012, thirty-two pages.

United States Advisory Action, U.S. Appl. No. 11/881,950, dated Feb. 29, 2012, three pages.

United States Office Action, U.S. Appl. No. 11/881,950, dated Dec. 19, 2011, thirty pages.

United States Office Action, U.S. Appl. No. 11/881,950, dated Jun. 14, 2011, thirty-one pages.

United States Office Action, U.S. Appl. No. 11/881,950, dated Oct. 19, 2010, twenty-eight pages.

United States Office Action, U.S. Appl. No. 11/881,950, dated Apr. 26, 2010, twenty-four pages.

United States Advisory Action, U.S. Appl. No. 11/881,950, dated Nov. 2, 2009, three pages.

United States Office Action, U.S. Appl. No. 11/881,950, dated Jul. 21, 2009, twenty-two pages.

United States Office Action, U.S. Appl. No. 11/881,950, dated Dec. 23, 2008, twenty pages.

United States Office Action, U.S. Appl. No. 11/881,950, dated May 28, 2008, fifteen pages.

United States Office Action, U.S. Appl. No. 13/936,106, dated Dec. 27, 2016, 32 pages.

United States Office Action, U.S. Appl. No. 13/936,106, dated Jul. 18, 2016, 30 pages.

United States Office Action, U.S. Appl. No. 13/936,106, dated Jun. 23, 2015, 26 pages.

* cited by examiner

METHOD FOR RELEVANCY RANKING OF PRODUCTS IN ONLINE SHOPPING

REFERENCE TO RELATED APPLICATIONS

This application is a Continuation of non-provisional U.S. patent application Ser. No. 13/936,106 filed on Jul. 5, 2013, which is a Continuation in Part (CIP) of non-provisional U.S. patent application Ser. No. 11/881,950 filed on Jul. 30, 2007, which claims priority from U.S. provisional patent application Ser. No. 60/835,556 filed Aug. 4, 2006, all of which are hereby incorporated by reference in their entireties.

BACKGROUND

The present invention relates to relevancy ranking in an information retrieval system. More specifically, the present invention relates to a method and system for relevancy ranking of products in online shopping.

The Internet has enabled online shopping, which has become popular because of its ease of use and fast processing. Further, it enables users to track down the vendors of a product online, and provides them with the facility of instant comparison of prices. This has made online shopping time-efficient and convenient, compared to conventional shopping. Search algorithms on the Internet help buyers to find any product from the multitude of products available online. Hence, a buyer can easily collect information about a product of his/her choice and purchase it accordingly.

However, the information available on the Internet is unstructured and unmanageable. Search engines provide results that have been sorted out to provide those that are relevant to the users, to help them search for products while shopping online. The sorting of results is based on context-based analysis of information, link analysis, or page-ranking algorithms. The results may be sorted, for example, based on the web pages that are frequently visited.

However, online product shopping is different from typical web search. For example, a query 'blue shirt' using existing search techniques would yield all type of results such as merchant pages, reviews, wikipedia entries, personal webpages, music bands, etc. This means the search results may not be related to the user intent—where the user expects to see a list of merchants selling blue colored shirts online with pictures and prices. Hence, the use of the existing web or content search techniques in online shopping may not yield relevant results. Further, the existing online shopping search techniques do not rank the search results, i.e., products based on product attributes such as brand, style, trend, and the like. Ranking products belonging to a particular category, based on their attributes, enables a user to compare products and helps him/her to make the best choice. This is because the user may be interested in, for example, products of a well known brand, products sold at a particular store in his locality, products of a top selling styles, products on sale, newly introduced products and the like. Therefore, the relevance or goodness of a product belonging to a particular category needs to be determined based on these factors to achieve experiential relevance. The goodness value refers to the relevance of the product to users. In other words, the goodness value indicates how good a product is given the market characteristics. In other words, to provide the user the best choices.

In light of the above discussion, there is a need for a method for ranking the results for a query in online shopping such that it provides the best results to the user considering the market demand-supply characteristics of products in a product category.

SUMMARY OF THE INVENTION

The present invention relates to a method for ranking one or more products in online shopping. The method includes extracting a first list of the one or more products based on at least one term in a search query received from a user. The one or more products are ranked based on a term score associated with each of the one or more products to generate a first ranked list. One or more attributes are identified associated with the one or more products. The one or more attributes comprising at least one of a brand name, a store name, a style, and price. An attribute score for each of the one or more attributes associated with each of the one or more products is determined based on one or more features associated with each of the one or more attributes. A relevance score is determined based on the term score and the attribute score. A marginal relevance score for each of the one or more products is determined based on at least one of the relevance score, the ranking of the one or more products, or a degree of similarity of the one or more attributes between the one or more products. The one or more products are ranked based on the marginal relevance score associated with each of the one or more products to generate a second list. The steps of the method are performed by a microprocessor.

The present invention also relates to a method for ranking one or more products in online shopping. The method includes receiving a first list of one or more products. The one or more products are ranked based on relevancy of the one or more products to a search query received from a user to generate a first ranked list. A discounted cumulative gain (DCG) score for the one or more products in the second list is determined based on the marginal relevance score. Ranking of the one or more products in the second list is modified based on at least one of a cost per click (CPC) associated with each of the one or more products, a loss of DCG score incurred due to modification of ranking of the one or more products, or a predetermined threshold value. The steps of the method are performed by a microprocessor.

The present invention further relates to a system for ranking one or more products in online shopping. The system includes a feature extraction module that is configured to extract a first list of the one or more products based on at least one term in a search query received from a user. The one or more products are ranked in the first list based on a term score associated with each of the one or more products to generate a first ranked list. The feature extraction module is further configured to identify one or more attributes associated with the one or more products, the one or more attributes comprising at least one of a brand name, a store name, a style, and price. The system further includes a computing module that is configured to determine an attribute score for each of the one or more attributes associated with each of the one or more products based on one or more features associated with each of the one or more attributes. Further, the computing module is configured to determine a relevance score based on the term score and the attribute score. The computing module is further configured to determine a marginal relevance score for each of the one or more products based on at least one of the relevance score, the ranking of the one or more products, or a degree of similarity of the one or more attributes between the one or more products. The computing module determines a discounted cumulative gain (DCG) score for the one or more products in the second list based on the marginal relevance score. The system further includes a product ranking module configured to rank the one or more products based on the marginal relevance score associated with each of the one or more products to generate a second list. Additionally, the system includes a revenue manager configured to modify ranking of the one or more products in the second list based on at least one of a cost per click (CPC) associated with each of the one or more products, a loss of DCG score incurred due to modification of ranking of the one or more products, or a predetermined threshold value.

The present invention encompasses numerous advantages. As the search results are diversified based on the set of attributes associated with each of the one or more products, the user has an option to view relevant products having diverse features. For example, a user may want to see different products having different attributes. Further, the products are re-ranked such that revenue of search engine can be maximized. A tradeoff between relevancy and maximization of the revenue enables search engine to increase revenue without hampering relevancy of the one or more products.

BRIEF DESCRIPTION OF THE DRAWINGS

The preferred embodiments of the invention will hereinafter be described in conjunction with the appended drawings, provided to illustrate and not to limit the invention, wherein like designations denote like elements, and in which.

DESCRIPTION OF PREFERRED EMBODIMENTS

The present invention relates to a method and system for relevancy ranking in an information retrieval system. More specifically, it relates to ranking products in a category in online shopping. The measure of relevance is a numerical score assigned to each search result, indicating the degree of proximity of a search result to the information desired by a user. In online shopping, the products in a category may be ranked according to relevance, based on a user's search query, and different attributes of the product category, providing the best choice of products to the user. In one embodiment of the present invention, a method for generating a "goodness" or relevance value of a product independent of a search query is also provided. The goodness value indicates the market demand-supply characteristic of the product. The goodness value is computed based on analysis of different attributes of the product such as brand, store, price, and the like. The analysis is performed by using market demand-supply characteristics of the product.

In order to determine the relevance ranking of the search results of a query, a set of attributes of products belonging to the same category, are extracted. Features of each of these attributes are analyzed and accordingly a score is calculated for each attribute. Further, each of these attributes is analyzed separately and weights are assigned to each of them. Subsequently, a 'ProductRank' is calculated by combining the weights and the scores of each attribute, using various combinational functions. The results are displayed to the user, based on the ProductRank. The goodness value of the products may be used for generating a product rank. The goodness value is an indication of market and bulk user preferences whereas a product rank is specifically based on the particular search query made by a user and the market demand-supply characteristics.

Figure 1:
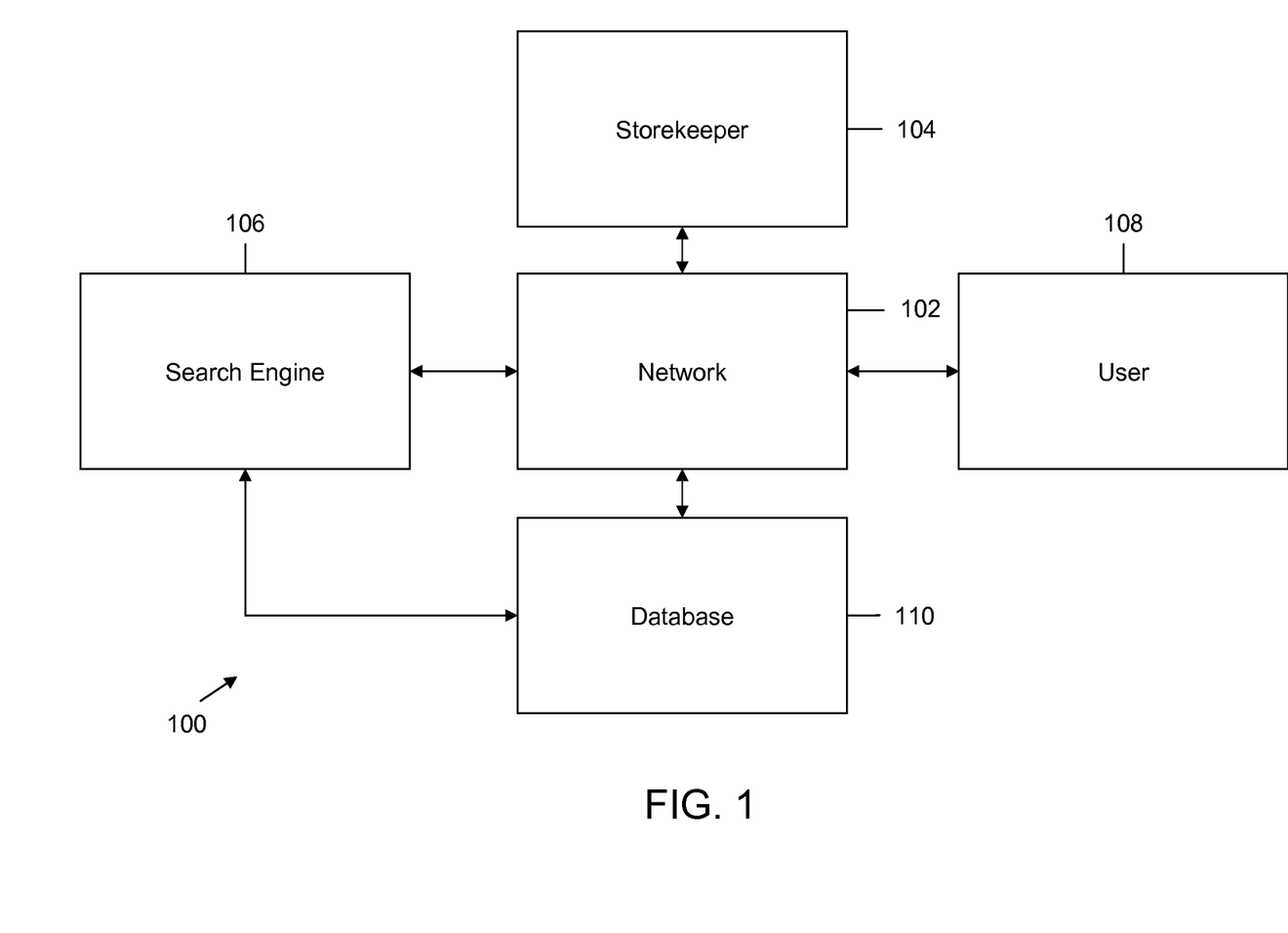
FIG. 1 is a block diagram of an environment in which various embodiments of the present invention may be practiced.

FIG. 1 is a block diagram of an environment 100 in which various embodiments of the present invention may be practiced. Environment 100 includes a network 102, a storekeeper 104, a search engine 106, a plurality of users 108, and a database 110. Storekeeper(s) 104, search engine 106, plurality of users 108 and database 110 are connected to network 102. Storekeeper 104 may post information about a store on network 102. For example, storekeeper 104 may launch a website of the store on the Internet or get the store registered in an online directory. User 108 queries search engine 106 to obtain information related to a product. Search engine 106 processes the search query to extract relevant product information stored in database 110. Database 110 is a comprehensive catalog of all online and offline product information collected from network 102. Further, search engine 106 executes the relevancy-ranking algorithm to provide the best choice of products to user 108. The relevancy rank is based on the attributes of the product category. This is explained in detail in conjunction with FIG. 2.

In various embodiments of the present invention, network 102 may be a wired or wireless network. Examples of network 102 include, but are not limited to, a Local Area Network (LAN), a Metropolitan Area Network (MAN), a Wide Area Network (WAN), and the Internet. Storekeeper 104 may be a data-processing unit or a human being. Examples of search engine 106 may include various search engines such as Google®, Yahoo®, TheFind®), and the like. Database 110 may be an independent database or a local database of search engine 106.

Figure 2:
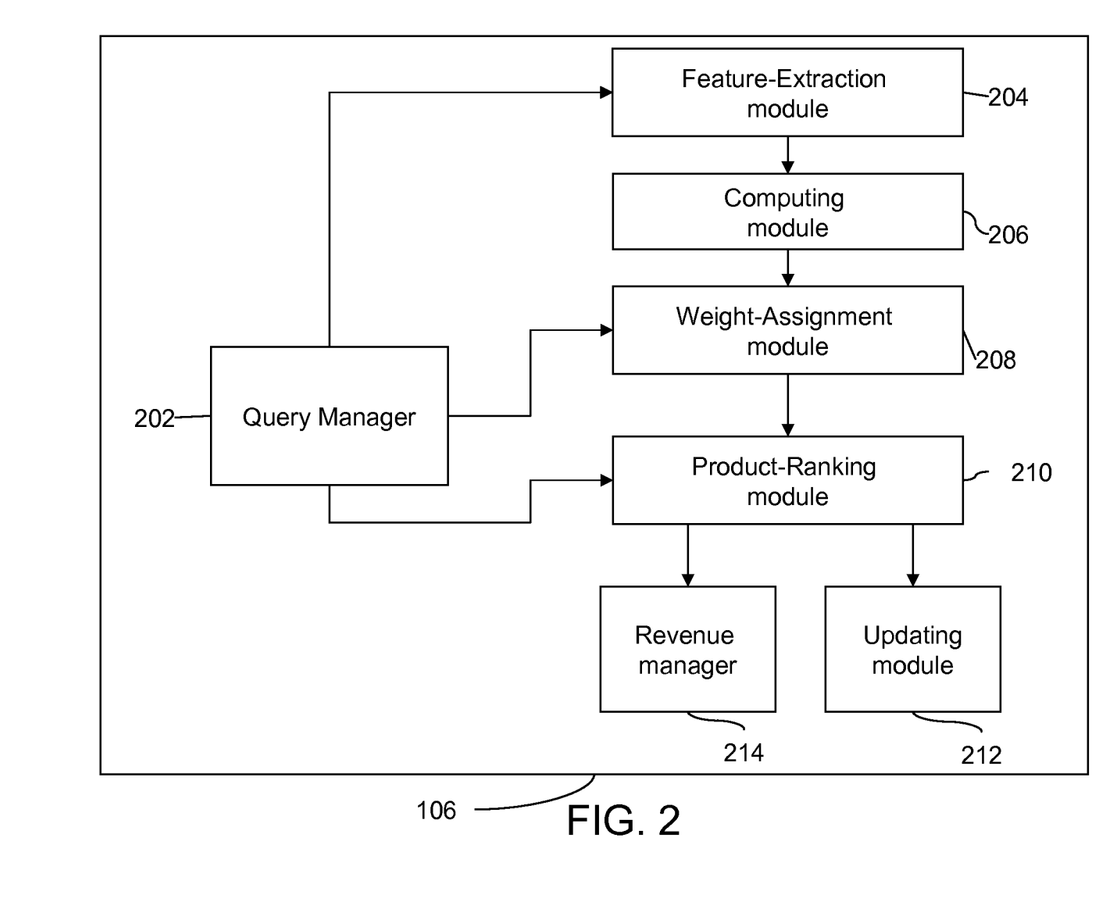
FIG. 2 is a block diagram of a system for relevancy ranking of products, in accordance with an exemplary embodiment of the present invention.

FIG. 2 is a block diagram of a system 200 for relevancy ranking of products, in accordance with an exemplary embodiment of the present invention. System 200 includes a query manager 202, a feature-extraction module 204, a computing module 206, a weight-assignment module 208 and a product-ranking module 210, and a revenue manager 214. Query manager 202 parses the query entered by user 108 and provides the parsed query to feature-extraction module 204. Feature-extraction module 204 searches for the products and determines a term score for each of the one or more products in the product category to generate a first ranked list of products. Feature-extraction module 204 determines a product category based on the parsed query. In an embodiment, the product category includes one or more products related to the product in the first ranked list. Further, feature-extraction module 204 identifies a set of attributes of the product category and extracts a set of features for each attribute. Accordingly, each product is represented by a vector of attributes. The attributes of a product may include 'Store', 'Brand', ' Style', price, whether the product is on sale, and the like. Features of an attribute may include, for example, number of products sold by a store, number of different merchants selling a particular brand, and the like. Computing module 206 analyzes features of each attribute of the product category separately and computes a value for each feature. The analysis, for example, may refer to reviewing the number of times a particular entity has been cited by other users, either on network 102 or in an offline store, the number of click outs of a product, the network traffic ranking of a store selling the product and the like. Computing module 206 further calculates a score of each attribute based on the analysis of features. Weight assignment module 208 assigns weights to each attribute, based on the importance of an attribute for the product category. The importance may be decided based on the search query. Product-ranking module 210 combines the weights and the score of each attribute with the help of various combinational functions, and generates a ProductRank for each product in the category. Ranking of the each product is described later in conjunction with FIG. 3 and FIG. 4. Product-ranking module 210 then provides the calculated ProductRank to query manager 202, which sorts the products, based on the ProductRank. Accordingly, the search results of the query are displayed to user 108. In an embodiment, prior to displaying search results to user 108, revenue manager 214 may modify the rank of the one or more products so that the revenue of search engine 106 may be maximized. In addition, system 200 also includes an updating module 212 which updates a product catalogue for a product periodically.

Feature-extraction module 204, computing module 206, weight-assignment module 208, product-ranking module 210 updating module 212, and revenue manager 214 interact with database 110. Further, feature-extraction module 204, computing module 206, weight-assignment module 208, product-ranking module 210 updating module 212, and revenue manager 214 are executable by a microprocessor in search engine 106 to perform predetermined operations.

In one embodiment of the invention, a goodness or relevance value for each product in database 110 is generated by feature-extraction module 204 and computing module 206 independent of the search query. For each product, feature-extraction module 204 defines attributes and computing module 206 computes a score for each attribute based on the market demand-supply characteristics for the product. The market demand-supply are determined by using the features of the attributes. For example, features such as number of products selling for each brand, financial details of a store are an indication of the market dynamics and accordingly consumer demand. Computing module 206 further combines the scores for each attribute to generate the goodness or relevance value for the product. In one embodiment of the invention, the goodness value of a product is used for generating a rank of the product in a product category.

In various embodiments of the present invention, query manager 202, feature-extraction module 204, computing module 206, weight-assignment module 208 and product-ranking module 210, and revenue manager 214 may be present within search engine 106. In various embodiments of the present invention, the different elements of system 200, such as query manager 202, feature-extraction module 204, computing module 206, weight-assignment module 208, product-ranking module 210 and updating module 212 and revenue manager 214 may be implemented as a hardware module, a software module, firmware, or a combination thereof. The functionalities of different modules of system 200 are explained in detail with the help of FIG. 3.

Figure 3:
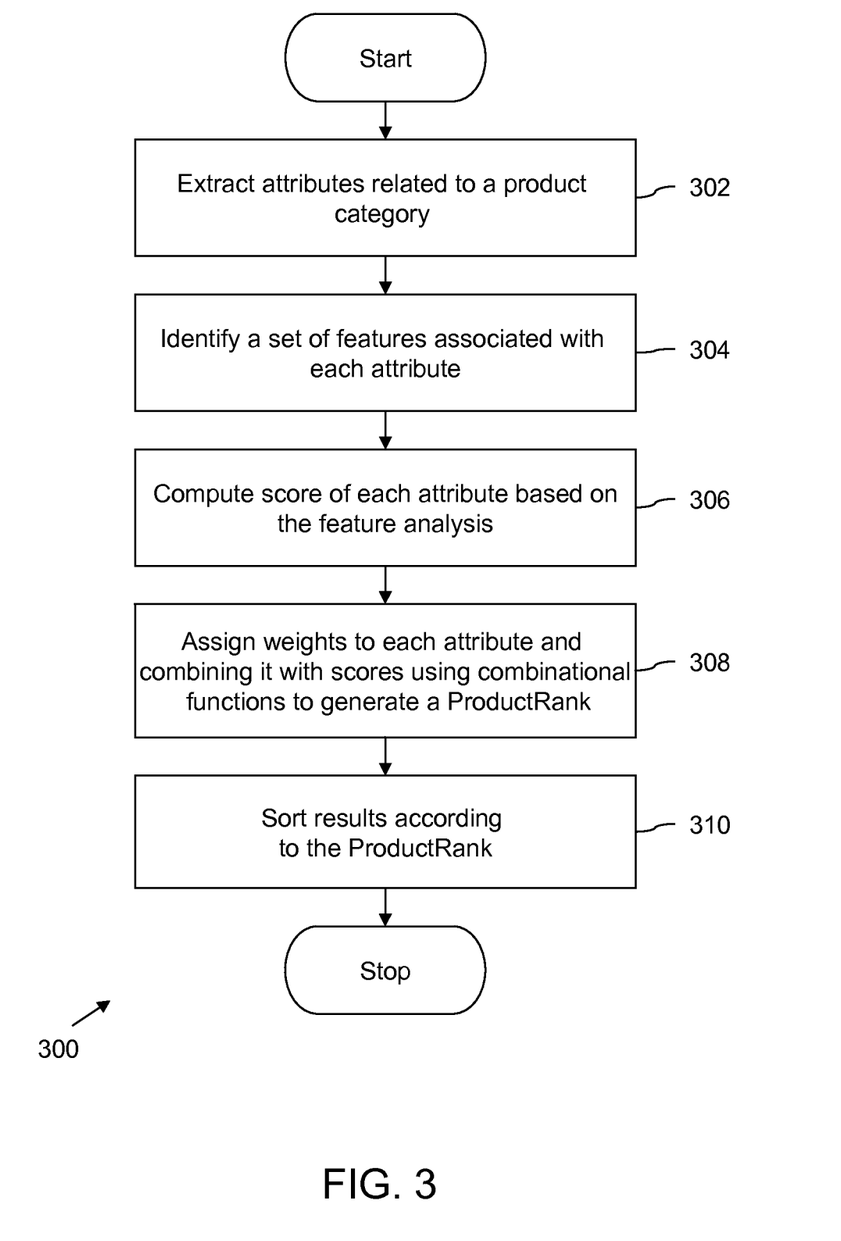
FIG. 3 is a flowchart of a method for relevancy ranking of products, in accordance with an exemplary embodiment of the present invention.

FIG. 3 is a flowchart of a method for relevancy ranking of products, in accordance with an exemplary embodiment of the present invention.

Initially, a search query is received from a user. The search query is parsed to identify one or more terms in the search query. In an embodiment, query manager 202 parses the query. The parsed query is received by feature-extraction module 204. Feature-extraction module 204 searches for one or more relevant products in database 110. A term score is assigned to each of the relevant products so as to generate a first ranked list.

At step 302, a set of attributes of the product category (for the products in the first ranked list) to which the search query belongs is extracted. For example, a query such as 'dress shirt' entered by user 108 may belong to the category of shirts and tops'. The set of attributes related to shirts and tops may include the name of the store selling the shirt, the brand, the style, the trend (the current preferred style by large numbers of users), the price, whether it is on-sale, whether it is a new launch and the like. At step 304, a set of features for each attribute are identified. For example, for store, the set of features may include number and variety of unique dress shirt provided by the store, financials of the company which owns the store, merchant reviews for that site, network traffic ranking of the store, number of users querying for that store, number of click-outs by users on products from that store (click-outs refers to the percentage of times people click on products from that store) and the like. The first feature is query dependent and the remaining features are query independent. Similarly, the features of brand attribute may include both query dependent and independent features like the number of merchants selling the brand, the quality of merchants carrying that brand, the range of designs available in the brand, the quality of the products of the brand, the prices of that brand, how many times users query for that brand, how many users click on that brand when it is shown to them, and the like. In some embodiments of the invention, a query independent or a query dependant analysis may be preformed. For example, query independent analysis at the category level indicates that Dicks Sporting Goods is a top store for shirts category and Nike is a top brand. However, a query dependent analysis performed on the products which match the query "dress shirt" with high scores indicates that Van Heusen and Arrow are better brands than Nike, and Nordstrom & Lands End are better stores than Dicks Sporting Goods for "dress shirts".

At step 306, the features of each attribute are analyzed to assign a score to each attribute. For example, for the 'brand' attribute, the feature analysis may indicate that a particular brand of shirts has been viewed by users the maximum number of times on the Internet; therefore, the high score may be assigned to that brand. In various embodiments of the invention, score of a 'brand', may be based on different brand features mentioned above. Similarly, the score of a store may be calculated based on a number of store features mentioned above. However, in various embodiments of the invention, in order to avoid the entry of stores with large portfolios of products, such as Wal-Mart, or stores that provide a marketplace to sell a variety of products, such as EBay, such stores are assigned a lower rating by the idf (inverted document frequency) factor in the feature analysis. The inverted document frequency refers to number of occurrences of particular terms in a document. In particular, idf is a measure of the general importance of a term in the search query. This is obtained by dividing the number of all documents by the number of documents containing the term, and then taking the logarithm of that quotient. In various embodiments of the invention, the score of an attribute can also be calculated with reference to the score of other attribute using an iterative analysis. For example, score of 'brand' can be calculated given the score of 'store'. This is explained in detail in conjunction with an example described in subsequent paragraphs.

Thereafter, at step 308, weights are assigned to each of the attributes and weights are combined with the scores by using combinational functions to generate a ProductRank for each product in the category. For example, a combinational function may be a linear combination. Thereafter, at step 310, the results of the search query are sorted according to the ProductRank. The products in the category are ranked according to their respective ProductRanks. The method and system described above may be explained with the following example.

A user may query the search engine for a product such as shirts. The key attributes related to shirts that may be considered for relevancy ranking include the name of the store, the brand, and the style. The search engine will search its database for all documents which are shirts, and analyze their attributes. The feature analysis for the store attribute identifies that Macy's, Kohls and Walmart are the top three stores for the shirts category. The scores assigned to these stores may be 5, 3 and 2, respectively. Similarly, Van Heusen, Ralph Lauren and Land's End may be the top three brands with scores 4, 3 and 1, respectively. Further, the style attribute may include striped shirts, plain shirts and check-patterned shirts with scores 5, 3 and 1, respectively, as the top three styles. Using 50 percent, 35 percent and 15 percent as the relative importance of the store, brand and style attributes, respectively, and combining the scores of these attributes according to linear weighting, the ProductRank of the shirts is generated as below:

Shirt 1: [Macy's, Land's End, Striped]

ProductRank=(0.5*5)+(0.35*1)+(0.15*5)=3.60

Shirt 2: [Modells, Ralph Lauren, Striped]

ProductRank=(0.5*2)+(0.35*3)+(0.15*5)=2.80.

Shirt 3: [Walmart, Van-Heusen, Plain]

ProductRank=(0.5*3)+(0.35*4)+(0.15*3)=3.35

Hence, shirt 1, shirt 3 and shirt 2 will be the order of listing the results after sorting is completed. In this example, the scores for each attribute is calculated independent of each other.

Another method to generate the product rank using a different combinational function is explained as follows. In this method, a score of an attribute is calculated and weight is assigned to the attribute based on the score and then a combination function is used to generate the product rank. Further, the score of an attribute is calculated independently based on its features, and then the score of other attributes are calculated based on the score of the independent attribute.

For example, the score of each store is determined independently and, based on this score, the scores of other attributes brand, style and the like are determined. The features of store may include number of unique products carried by the store, the idf factor of the store, online traffic ranking of the store, financials of the company owning the store, number of click outs, user query and the like. In these features, the number of user click outs and the user query account for the user behavior or user interest aspects. To calculate the score of the store, the distribution of the values of each feature is obtained and the distribution curve is smoothened. The distribution may be smoothened by taking logarithm of the values. These values are then normalized and combined with weights to calculate the score of the store. The score of the store is calculated using the following equation:

$$\text{Score of Store} = \Sigma W_i * F(G(X_i)) \quad (1)$$

where $W_i$ is the weight of $i^{th}$ feature of the attribute

F—represents the smoothening function

G—represents the Normalization function $X_i$—is the value of the i feature

Accordingly, the score of the attribute brand is calculated with respect to the score of the attribute store by using a brand-store affinity matrix. The brand-store affinity matrix is represented as:

| | Store | |
|---|---|---|
| Brand | X | Y |
| A | AX - (Score of the store X * number of items of the brand A available in the store X) | AY - (Score of the store Y * number of items of the brand A available in the store Y) |
| B | BX - (Score of the store X * number of items of the brand B available in the store X) | BY - (Score of the store X * number of items of the brand B available in the store Y) |

In the above matrix, A and B represents two brands and X and Y represent two stores selling products of these brands. Using the above affinity matrix the score of each brand is calculated. For example, the score of brand A is sum of AX and AY. Further, weights can be assigned with each brand and using the weights the score of the brand can be calculated. This provides additional score to the brands which are being carried by top ranked stores.

Similarly, scores of other attributes Style, On-sale, New or not is calculated with respect to the score of store. Accordingly, the rank of a product is calculated by combining the scores of each attribute.

$$\text{Product Rank} = \Sigma W_i S_i \quad (2)$$

Where $W_i$—Weight assigned to each attribute $S_i$—Score of each attribute

In various embodiments of the invention, the score of the attributes can be estimated using a similar method with reference to other attributes such as brand, style, and the like. The base attribute with reference to which score of other attributes is calculated can be decided based on the category of a product. For example, for Shirts, brand is more important than style or on-sale attribute and hence, first score of brand may be calculated independently and then the scores of other attributes may be calculated based on the score of the brand.

Figure 4:
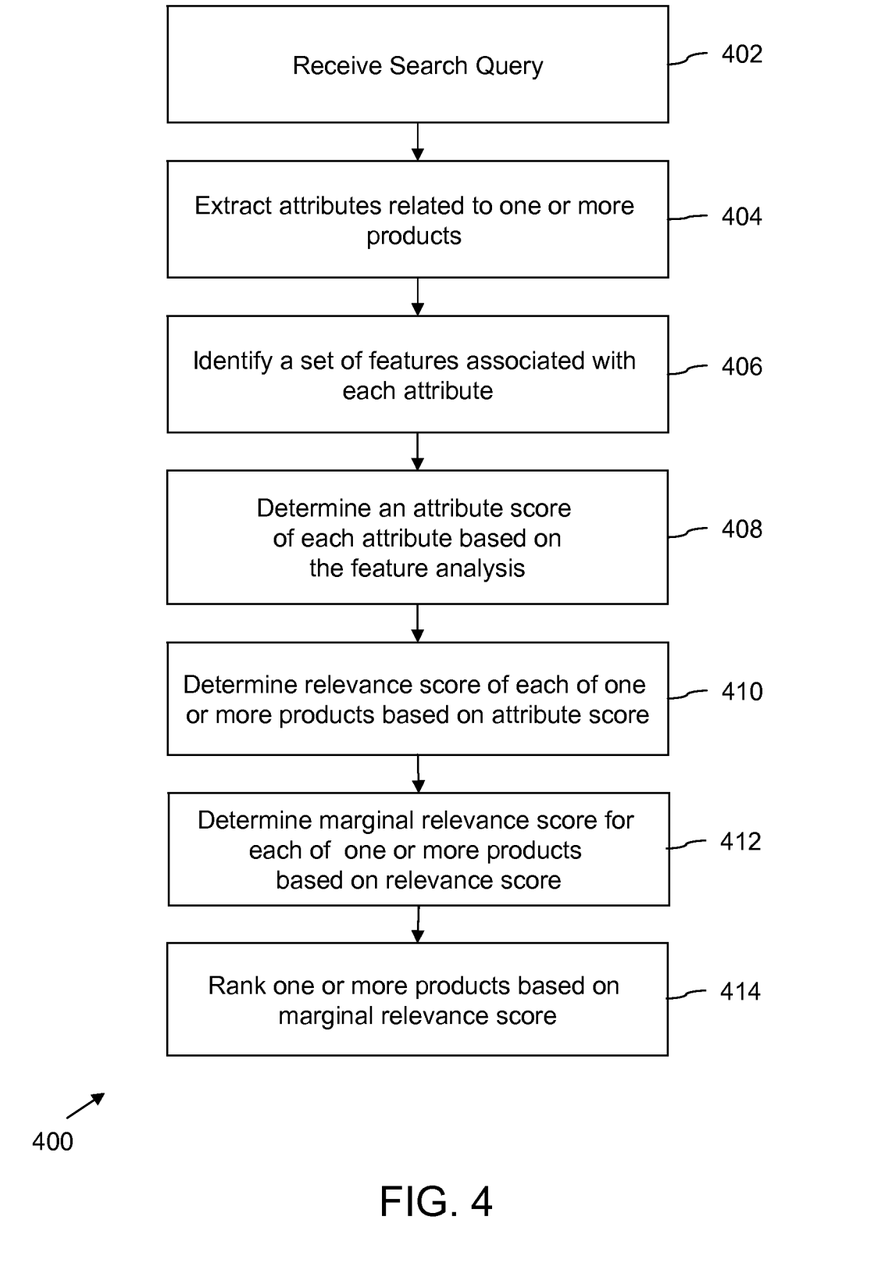
FIG. 4 is a flowchart of another method for ranking of products, in accordance with an exemplary embodiment of the present invention.

FIG. 4 is a flowchart 400 illustrating another method of ranking products, in accordance with an exemplary embodiment of the present invention. Flowchart 400 is described in conjunction with FIG. 1, FIG. 2 and FIG. 3.

At step 402, a search query is received from a user. The search query is parsed to identify one or more terms in the search query. In an embodiment, query manager 202 parses the query.

The parsed query is received by feature-extraction module 204. Feature-extraction module 204 identifies the one or more products based on the one or more terms in the search query. Further, feature-extraction module 204 assigns a term score to each of the one or more products based on location of the term in the corresponding description of a product. For instance, if a term in the search query is present in the title of the product, the term score for the product will be high for the term identified in the title of the product. For example, a search query "DSLR camera" is received from the user. The search query includes the terms "DSLR" and "camera". Feature-extraction module 204 identifies one or more products related to "DSLR camera" by comparing the terms with the products information/description stored in database 110. For instance, feature-extraction module 204 finds a first product that is titled as "digital camera". Further, the feature-extraction module 204 identifies that the first product includes the term "DSLR" in the description for the product, feature-extraction module 204 may assign a term score of 0.9 to the term "camera" and "0.3" to the term "DSLR". Further, feature-extraction module 204 stores the term score assigned to each term for each of the one or more identified products in database 110. Computing module 206 extracts the term score for each of the one or more identified products from database 110. Thereafter, computing module 206 determines a cumulative term score for each of the one or more products by adding the term score of individual terms for each of the one or more products. For instance, for the first product identified by the feature-extraction module 204, the cumulative terms score is "1.2" (i.e., 0.3+0.9). Based on the cumulative term score, feature-extraction module 204 extracts a first list of the one or more products in a predefined order (e.g., generates a first ranked list). Further, feature-extraction module 204 stores the first ranked list in database 110.

At step 404, the set of attributes for each of the one or more products is extracted from database 110 as described in step 302. At step 406, a set of features associated with each attribute in the set of attributes is identified as described in step 304. At step 408, an attribute score is determined for each attribute in the set of attributes for each of the one or more products as described in step 306.

At step 410, a relevance score of each of the one or more products in the first ranked list is determined. In an embodiment, computing module 206 determines the relevance score. Computing module 206 extracts the term score (determined in step 402) for each of the one or more products in the first ranked list. Further, computing module 206 extracts the attribute score for each attribute in the set of attributes. Based on the attribute score for each attribute in the set of attributes and the term score, a relevance score for each of the one or more products in the first ranked list is determined. In an embodiment, computing module 206 determines the relevance score using the following equation:

$$\text{Relevance score } (r) = \text{term score } (r) * \text{Attribute score } (r) \quad (3)$$

Where,
r: Identified product;

At step 412, a marginal relevance score for each of the one or more products in the first ranked list is determined. In an embodiment, computing module 206 determines the marginal relevance score based on the relevance score (computed using equation 3) and ranking of the one or more products in the first ranked list. The marginal relevance score is used for re-ranking the one or more products in order to diversify the search results. Initially, the marginal relevance score for each of the one or more products is initialized as the relevance score of the each of the one or more products. Thereafter, the one or more attributes of each of the one or more products is compared with the one or more attributes of the products ranked above it. For example, the one or more attributes of a first product is compared with the one or more attributes of the products ranked above the first product. In a scenario, where the one or more attributes of the first product is the same as the one or more attributes of a product ranked above the first product, the marginal relevance score of the first product is reduced. The determination of the marginal relevance score is described below with a help of an example.

As described above, the one or more products in the first ranked list are sorted in the predetermined order. In order to provide the user with diversified results, the one or more products are re-sorted/re-ranked based on the set of attributes and the relevance score. For example, a user is interested in shirts. The one or more shirt products identified by feature-extraction module 204 may include one or more products from "Macys" store that have high term score. Due to the high term score, the one or more products from the "Macys" store have a better rank and hence will be displayed first to the user. The user may want see the products from different stores. Thus, in order to diversify the results, a marginal relevance score for each of the one or more products in the first ranked list is determined based on the set of attributes associated with each of the one or more products. In an embodiment, the first ranked list is re-ranked based on the set of attributes by determining the marginal relevance score. In an embodiment, computing module 206 utilizes the following equation to determine marginal relevance:

$$\text{Marginal relevance } (r) = \text{relevance } (r) \quad (4)$$

$$\text{Marginal relevance } (r') = \text{Marginal relevance } (r')* \\ (\alpha\hat{\,}\text{similarity } (r,r')) \quad (5)$$

Where,
α: predetermined constant;
r: an array of products ranked above the product r'; and
Similarity(r,r'): a measure of similarity between the r' and r.

Computing module 206 computes the marginal relevance score for each of the one or more products in the list for each attribute in the set of attributes associated with each of the one or more products. Computing module 206 stores the marginal relevance score associated with each of the one or more products in database 110.

At step 414, the one or more products in the first ranked list are ranked based on the marginal relevance score. In an embodiment, product-ranking module 210 ranks the one or more products in accordance with the marginal relevance score to generate a second list. Product-ranking module 210 stores the second list in database 110.

For example, a user submits a query "camera" to search engine 106. Feature-extraction module 204 extracts a list containing one or more products from database 110 based on the query. Further, the list is ranked based on the term score computed by computing module 206 (as described in step 402). The following table represents the list of the one or more products:

TABLE 2

An example list of the one or more products

| Product | Store | Term score | Store score | Relevance score |
|---------|-------|------------|-------------|-----------------|
| Camera-1 | Amazon ® | 3.5 | 5 | 17.5 |
| Camera-2 | Amazon ® | 3.0 | 5 | 15 |

TABLE 2-continued

An example list of the one or more products

| Product | Store | Term score | Store score | Relevance score |
|---|---|---|---|---|
| Camera-3 | Flipkart ® | 2.5 | 4 | 9 |
| Camera-4 | Ebay ® | 2.0 | 3 | 6 |

Computing module 206 computes a relevance score for each of the one or more products in the list as described in step 408. Thus, the relevance score for "camera-1", "camera-2", "camera-3", and "camera-4" is "17.5", "15", "9", and "6", respectively. Additionally, computing module 206 initializes a marginal relevance score for each of the one or more products as the relevance score.

Computing module 206 adjusts the marginal relevance score for each of the one or more products based on the attribute associated with each of the one or more products. Since "camera-1" is ranked 1, the marginal relevance score for the "camera-1" is same as the relevance score. "Camera-2" is ranked 2nd in the list. Also, the store for the "camera-2" is same as the "camera-1" store (i.e., Amazon®). Thus, similarity function (i.e., similarity (r, r')) in equation 5 will return value "1".

For the purpose of this example, let α=0.5. Hence, using equation 5, computing module 206 determines the marginal relevance score for "camera-2" as "7.5". As stores associated with the "camera-3" and the "camera-4" are not similar to the stores associated with the "camera-2" and the "camera-1" that are ranked above "camera-3" and "camera-4", the marginal relevance score for the "camera-3" and "camera-4" will be the same as the respective relevance scores (i.e., 9 and 6 respectively).

Product-ranking module 210 ranks the one or more products based on the marginal relevance score. As the marginal relevance score of the "camera-2" is less than the marginal relevance score of the "camera-3". Thus, the "camera-2" is ranked below "camera-3". The following table illustrates the re-ranked list of the one or more products:

TABLE 3

Re-ranked list of the one or more products

| Product | Store | Term score | Store score | Marginal Relevance score |
|---|---|---|---|---|
| Camera-1 | Amazon ® | 3.5 | 5 | 17.5 |
| Camera-2 | Flipkart ® | 2.5 | 4 | 9 |
| Camera-3 | Amazon ® | 3.0 | 5 | 7.5 |
| Camera-4 | Ebay ® | 2.0 | 3 | 6 |

In an embodiment of the invention, if the query also includes an attribute, along with the product category, then that attribute acts as a filter and the relative ranking of the results remains the same. For example, if the query is 'Lee shirts', then the brand attribute is removed while calculating the ProductRank.

In another embodiment of the invention, the product category mentioned in the search query may have no relevant attributes, for example, 'socks', where attributes such as store, style and trend do not matter much to the users. In such cases, the sales factor may be considered for ranking the search results. Hence, the relevant choice of attributes is important depending on the category or the query.

In various embodiments of the invention, the ranking of products is dynamic, since database 110, which is a catalogue of the products that are available online or offline, is updated periodically with information from network 102. The ranking of products is carried out for a specific duration of time. For example, ranking of products may change according to season. For example, a best-selling woolen shirt brand may not necessarily be the best-selling cotton shirt brand. Hence, the ranking for each attribute is modified by recalculating the weights and generating a new ProductRank.

In accordance with various embodiments of the invention, a goodness or relevance value of the products in database 110 is calculated without considering the search query. The goodness value of the product is estimated by defining the attributes for a product category and then analyzing the attributes based on the value of features as explained in the method described in FIG. 3. The value of the features is determined using the market demand-supply characteristics for the product. The market demand-supply characteristics includes the number of products being sold for each brand, the quality of products of a brand, the financials of a store selling the product, the range of designs available in the brand and the number of click-outs by a user and the like. For example, number of products selling for each brand indicates the demand for the product. The goodness value of the product is calculated by combining the score of each attribute. Any combinational function as described above may be used to generate the goodness value. The goodness value of the product is then used to rank the search results of a query.

Since search engine 106 publicizes the products being sold by the store, the search engine owner might have some financial arrangement with the store owners, for example the store owner may have to pay the owner of search engine 106 for the displaying results pertaining to the store. For example, Ebay® may have to pay search engine 106 for displaying result from Ebay®. In an embodiment, store owners pay search engine 106 based on cost per click (CPC) paying model. In such model for each click made by a user, the store owner has to pay a predetermined amount to search engine 106. Also, some store owners may not want to pay search engine 106. Thus, in order to maximize revenue, search engine 106 may have to tradeoff between relevant results and revenue generation.

Figure 5:
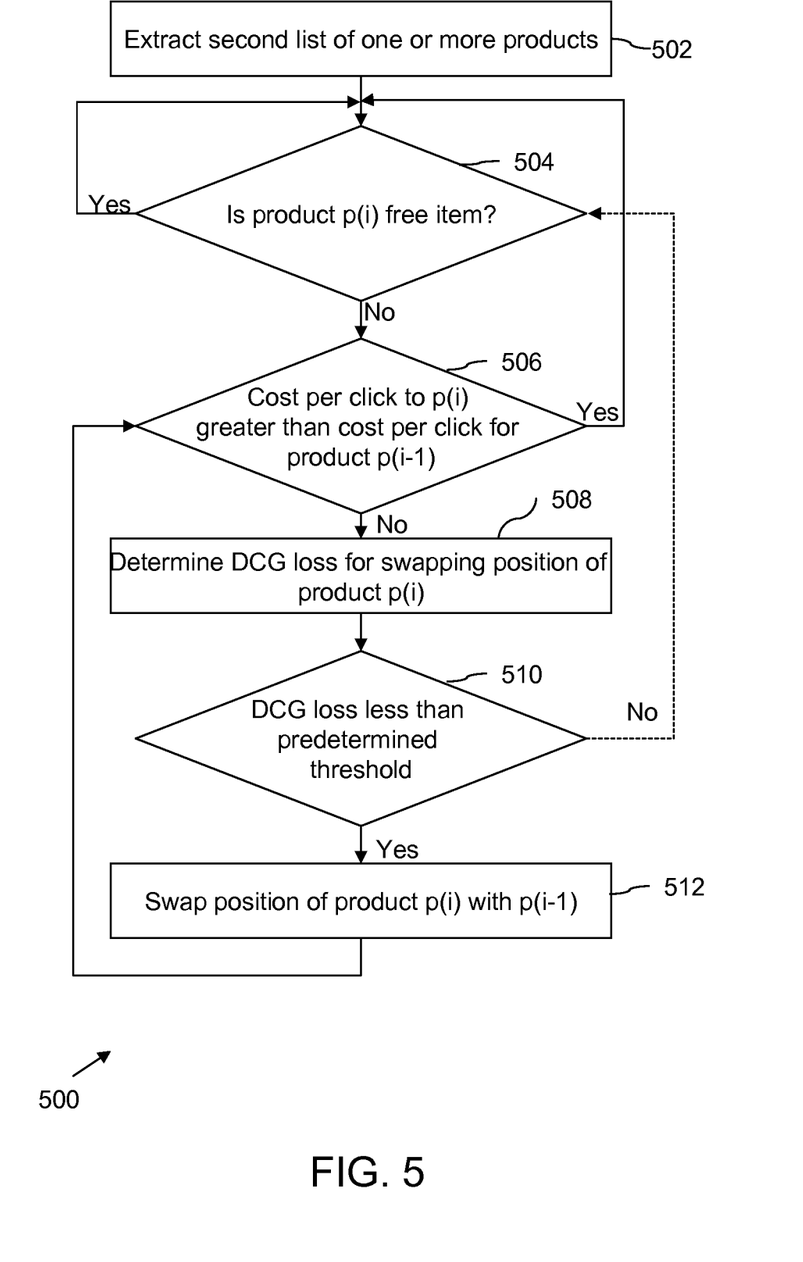
FIG. 5 is a flowchart illustrating a method for ranking products in order to maximize revenue, in accordance with an exemplary embodiment of the present invention.

FIG. 5 is a flowchart 500 illustrating a method for re-ranking the list of the one or more products in order to maximize revenue generation, in accordance with an exemplary embodiment of the present invention. The flowchart 500 is described in conjunction with FIG. 1 and FIG. 2.

At step 502, the second list (re-ranked list) of the one or more products is extracted from database 110. For each of the one or more products a discounted cumulative gain (DCG) score is determined based on the marginal relevance score associated with each of the one or more products. In an embodiment, the DCG score is indicative of relevance of the list of the one or more products. For example the DCG score of a first list of one or more products is 2.0 and the DCG score of a second list of the one or more products is 1.5. The first list of the one or more products is more relevant to the search query in comparison to the relevance of the second list of one or more products. In an embodiment, computing module 206 utilizes following equation to determine discounted cumulative gain score:

$$DCG_k = \Sigma_{1 \leq i \leq k} \text{ Marginal Relevance } (r_i)/\log(i+1) \quad (6)$$

Where, k: a number of the one or more products in the second list.

At step 504, a check is performed whether a product at position i (hereinafter referred as p(i)) in the second list is a free item (i.e., the owner of the product p(i) does not pay the owner of search engine 106 for each click made by user). In an embodiment, revenue manager 214 performs the check. If at step 504 it is determined that p(i) is free item, position i is incremented and step 504 is repeated. If at step 504 it is determined that product p(i) is not a free item, step 506 is performed.

At step 506, a check is performed whether the cost per click amount for product p(i) is greater than the cost per click amount of product p (i−1). In an embodiment, revenue manager 214 performs the check. If at step 506 it is determined that cost per click amount paid for p(i−1) is greater than cost per click amount paid for the product p(i), position i is incremented and step 504 is repeated. However, if at step 506 it is determined that the amount paid by the product p(i) is greater than the amount paid by p(i−1), step 508 is performed.

At step 508, a DCG loss incurred on improving the rank of product p(i) above the product p(i−1) is determined. In an embodiment, the DCG loss is determined by the computing module 206. In an embodiment, the DCG loss is determined using the following equation:

DCG loss at position $i-1$=(Marginal relevance score of product $p(i)$−Marginal relevance score of product when swapped to position $i-1$)/log($i$+1)    (7)

At step 510, a check is performed whether the DCG loss is less than a predetermined threshold value. If at step 510 it is determined that the DCG loss is less than the predetermined threshold value, step 512 is performed. At step 512 the position of the product p(i) is swapped with product at the position i−1. Further position i is decremented and step 506 is repeated. However, as the DCG loss is greater than the predetermined threshold value, i is incremented and step 504 is repeated.

For example, the second list the second list extracted from database 110 is the same as that illustrated in table 3. In table 3, let Ebay® be the store that pays search engine based on cost per click.

Computing module 206 determines a DCG score for each of the one or more products in the second list. Thereafter, revenue manager 214 follows the steps in flowchart 500. Revenue manager 214 determines that the cost per click for "camera-4" is greater than the cost per click for "camera-2". If the DCG loss for swapping the positions of "camera-2" and "camera-4" is within a predetermined threshold, revenue manager 214 swaps the position of "camera-4" and "camera-2".

Similarly, revenue manager 214 determines that cost per click for "camera-4" (now at position 3) is more than cost per click of "camera-3" (ranked at position 2). Further, revenue manager 214 determines that the DCG loss for swapping positions of "camera-3" with "camera-4" is greater than predetermined threshold. Thus, revenue manager 214 will not swap the position of the "camera-3" with "camera-4".

A person having ordinary skill in the art would understand that the scope of the disclosure should not be limited to modifying raking of the one or more products that have been ranked based on the marginal relevance score. In an embodiment, ranking of any pre-ranked list of products can be modified by the method illustrated in the flowchart 500.

The above method and system thus performs the product analysis at multiple level of granularity, i.e., at product category level and at query level. The query level analysis is performed in conjunction with the product category level analysis. The method and system described above have a number of advantages. The method provides relevancy ranking in an online shopping system, performing attribute-wise ranking of a product category. Thereby, the method lists the best products in the list at the top, according to the choice of the users, thus providing experiential relevance The results of a search query processed by using the method described above, in accordance with an embodiment of the invention, may be presented to the user in a variety of ways. By way of example only, the results of a search query 'dress shirt' may list dress shirts in different price ranges offered by various stores. Further, an image may be provided for each result to facilitate the selection of a desired dress shirt. The search results page may also list top selling brands and top selling styles related to shirts for user's reference. These are based on the market demand-supply characteristics. In other words, the popularity of a brand or style. Along with popularity of the brand and style, the search results are diversified based on the set of attributes associated with each of the one or more products. For example, a user may want to see different products having different attributes. Thus result diversification of the list of one or more products enables the user to see relevant products having different set of attributes.

Further, the products are re-ranked such that revenue of search engine 106 can be maximized. A tradeoff between relevancy and maximization of the revenue enables search engine 106 to increase revenue without hampering the relevancy of the one or more products.

The system for relevancy ranking of products in an online shopping system, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit, and the Internet. The computer also comprises a microprocessor, which is connected to a communication bus. The computer also includes a memory, which may include Random Access Memory (RAM) and Read Only Memory (ROM). Further, the computer system comprises a storage device, which can be a hard disk drive or a removable storage drive such as a floppy disk drive, an optical disk drive, etc. The storage device can also be other similar means for loading computer programs or other instructions into the computer system. The computer system also includes a communication unit. The communication unit allows the computer to connect to other databases and the Internet through an I/O interface. The communication unit allows the transfer as well as reception of data from many other databases. The communication unit includes a modem, an Ethernet card, or any similar device, which enables the computer system to connect to databases and networks such as LAN, MAN, WAN and the Internet. The computer system facilitates inputs from a user through an input device that is accessible to the system through an I/O interface.

The computer system executes a set of instructions that are stored in one or more storage elements, in order to process the input data. The storage elements may also hold data or other information, as desired, and may be in the form of an information source or a physical memory element in the processing machine.

The set of instructions may include various commands instructing the processing machine to perform specific tasks such as the steps that constitute the method of the present invention. The set of instructions may be in the form of a software program. Further, the software may be in the form of a collection of separate programs, a program module with a larger program, or a portion of a program module, as in the present invention. The software may also include modular programming in the form of object-oriented programming. The processing of input data by the processing machine may be in response to a user's commands, the results of previous processing, or a request made by another processing machine. The instructions are supplied by various well known programming languages and may include object oriented languages such as C++, Java, and the like.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method comprising:
receiving a ranked list comprising a plurality of products, each product associated with one or more attributes;
for each product in a subset of the plurality of products:
determining a similarity between an attribute of the product on the ranked list and an attribute of a second product on the ranked list; and
diversifying the ranked list by modifying a ranking of the product based on the determined similarity;
determining a discounted cumulative gain (DCG) score for the diversified ranked list for each product in the subset of the plurality of products; and
modifying a ranking of a product in the diversified ranked list, wherein modifying the ranking includes:
determining a position adjustment for a product of the plurality of products in the diversified ranked list based on a cost of the product paid by an owner of the product in response to the cost of the product paid by the owner of the product being less than a cost paid by an owner of another product having a higher position in the diversified ranked list;
determining a loss of DCG score for the diversified ranked list for the product due to performing the position adjustment for the product, the loss of the DCG score for the diversified ranked list for the product comprising a difference between the DCG score for the diversified ranked list for the product and an alternative DGC for the diversified ranked list with the position adjustment for the product; and
responsive to determining that the loss of DCG score is less than a predetermined threshold value, modifying the ranking of the product in the diversified ranked list.

2. The method of claim 1, further comprising:
receiving a search query, wherein the DCG score for the diversified ranked list reflects a relevance of the diversified ranked list for the received search query in comparison to a relevance of a different diversified rank list for the received search query.

3. The method of claim 1, wherein determining the DCG score for the diversified ranked list comprises summating a plurality of marginal relevance scores, each marginal relevance score assigned to each product in the diversified ranked list.

4. The method of claim 3, wherein determining the loss of DCG score incurred by the diversified ranked list due to performing the position adjustment for the product comprises:
determining a modified marginal relevance score for the product based on the position adjustment for the product;
adjusting the DCG score based on the determined modified marginal relevance score for the product; and
determining a difference between the DCG score and the adjusted DCG score.

5. The method of claim 3, wherein each marginal relevance score is determined based on a measure of similarity between a product assigned the marginal relevance score and one or more products ranked higher than the product in the diversified ranked list.

6. The method of claim 3, wherein modifying the ranking of the product further comprises:
prior to determining the position adjustment, determining that the product is associated with the cost of the product, wherein the cost of the product is paid by the owner of the product.

7. The method of claim 1, wherein determining the position adjustment for the product comprises identifying a different product in the diversified ranked list ranked immediately above the product in the diversified list.

8. The method of claim 1, wherein the cost of the product comprises a cost per click (CPC) of the product.

9. A non-transitory computer readable medium comprising computer code that, when executed by a processor, causes the processor to:
receive a ranked list comprising a plurality of products, each product associated with one or more attributes;
for each product in a subset of the plurality of products:
determine a similarity between an attribute of the product on the ranked list and an attribute of a second product on the ranked list; and
diversify the ranked list by modifying a ranking of the product based on the determined similarity;
determine a discounted cumulative gain (DCG) score for the diversified ranked list for each product in the subset of the plurality of products; and
modify a ranking of a product in the diversified ranked list, wherein modifying the ranking includes:
determine a position adjustment for a product of the plurality of products in the diversified ranked list based on a cost of the product paid by an owner of the product in response to the cost of the product paid by the owner of the product being less than a cost paid by an owner of another product having a higher position in the diversified ranked list;
determine a loss of DCG score for the diversified ranked list for the product due to performing the position adjustment for the product, the loss of the DCG score for the diversified ranked list for the product comprising a difference between the DCG score for the diversified ranked list for the product and an alternative DGC for the diversified ranked list with the position adjustment for the product; and
responsive to determine that the loss of DCG score is less than a predetermined threshold value, modify the ranking of the product in the diversified ranked list.

10. The non-transitory computer readable medium of claim 9, further comprising computer code that, when executed by a processor, causes the processor to:
receive a search query, wherein the DCG score for the diversified ranked list reflects a relevance of the diversified ranked list for the received search query in comparison to a relevance of a different diversified rank list for the received search query.

11. The non-transitory computer readable medium of claim 9, wherein the computer code that causes the processor to determine the DCG score for the diversified ranked list further comprises computer code that, when executed by the processor, causes the processor to summate a plurality of marginal relevance scores, each marginal relevance score assigned to each product in the diversified ranked list.

12. The non-transitory computer readable medium of claim 11, wherein the computer code that causes the processor to determine the loss of DCG score incurred by the diversified ranked list due to performing the position adjustment for the product further comprises computer code that, when executed by the processor, causes the processor to:
determine a modified marginal relevance score for the product based on the position adjustment for the product;
adjust the DCG score based on the determined modified marginal relevance score for the product; and
determine a difference between the DCG score and the adjusted DCG score.

13. The non-transitory computer readable medium of claim 11, wherein each marginal relevance score is determined based on a measure of similarity between a product assigned the marginal relevance score and one or more products ranked higher than the product in the diversified ranked list.

14. The non-transitory computer readable medium of claim 11, wherein the computer code that causes the processor to modify the ranking of the product further comprises computer code that, when executed by the processor, causes the processor to:
prior to determine the position adjustment, determine that the product is associated with the cost of the product, wherein the cost of the product is paid by the owner of the product.

15. The non-transitory computer readable medium of claim 9, wherein the computer code that causes the processor to determine the position adjustment for the product further comprises computer code that, when executed by the processor, causes the processor to:
identify a different product in the diversified ranked list ranked immediately above the product in the diversified list.

16. The non-transitory computer readable medium of claim 9, wherein the cost of the product comprises a cost per click (CPC) of the product.

* * * * *

UNITED STATES PATENT AND TRADEMARK OFFICE
CERTIFICATE OF CORRECTION

PATENT NO. : 11,062,372 B2
APPLICATION NO. : 15/667580
DATED : July 13, 2021
INVENTOR(S) : Apurva Jadhav et al.

Page 1 of 1

It is certified that error appears in the above-identified patent and that said Letters Patent is hereby corrected as shown below:

In the Claims

In Column 15, Claim 1, Line 55, delete "DGC or" and insert -- DCG or --, therefor.

In Column 16, Claim 5, Line 18, delete "assigned the" and insert -- assigned to the --, therefor.

In Column 16, Claim 9, Line 62, delete "DGC for" and insert -- DCG for --, therefor.

In Column 18, Claim 13, Line 4, delete "assigned the" and insert -- assigned to the --, therefor.

Signed and Sealed this
Twenty-fifth Day of January, 2022

Drew Hirshfeld
*Performing the Functions and Duties of the
Under Secretary of Commerce for Intellectual Property and
Director of the United States Patent and Trademark Office*